Nov. 20, 1945.   I. COWLES   2,389,233
COUPLING NUT FOR FLANGED TUBING CONDUITS
Filed July 28, 1942   5 Sheets-Sheet 1

Inventor:
Irving Cowles
By Rudolph M... Atty.

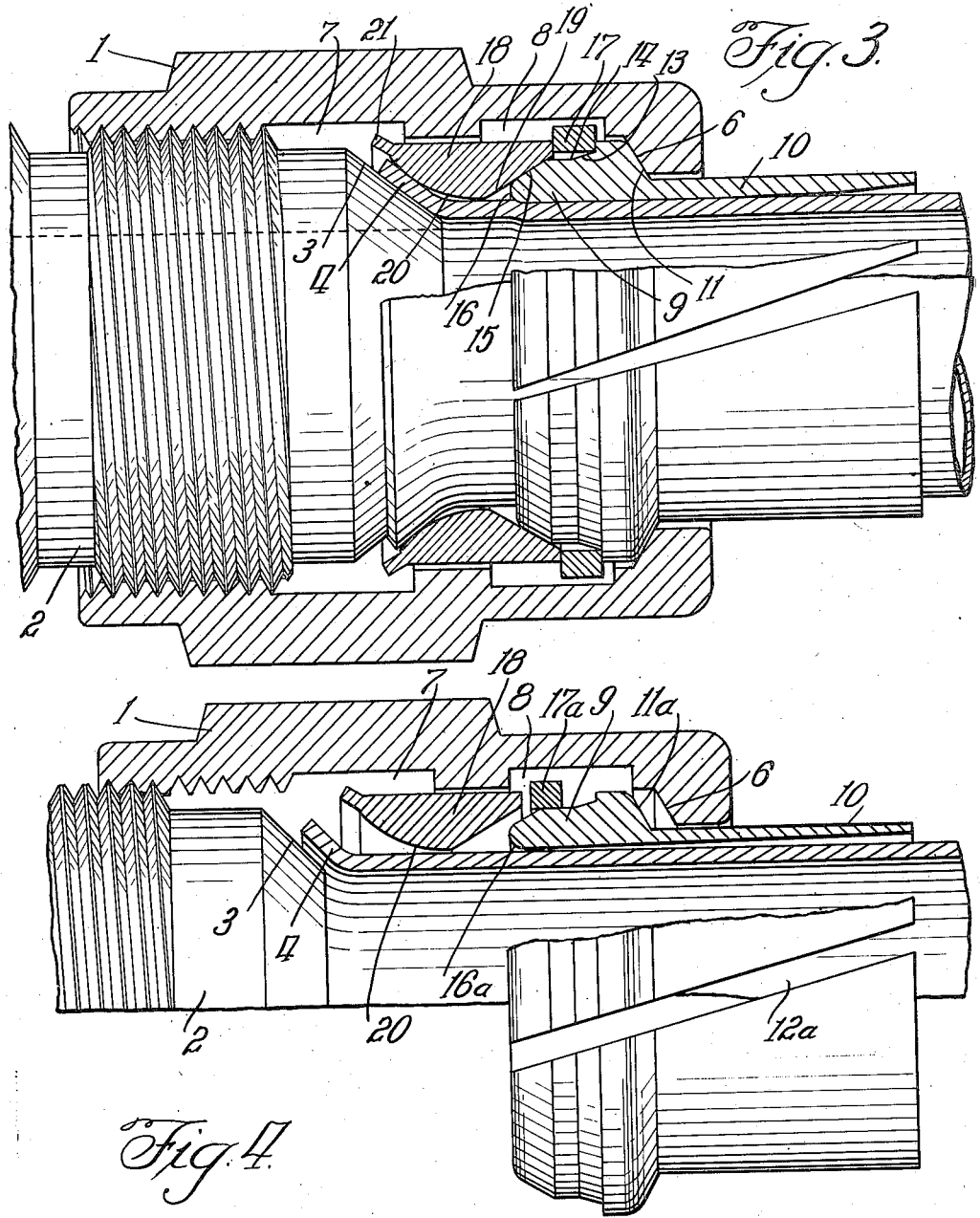

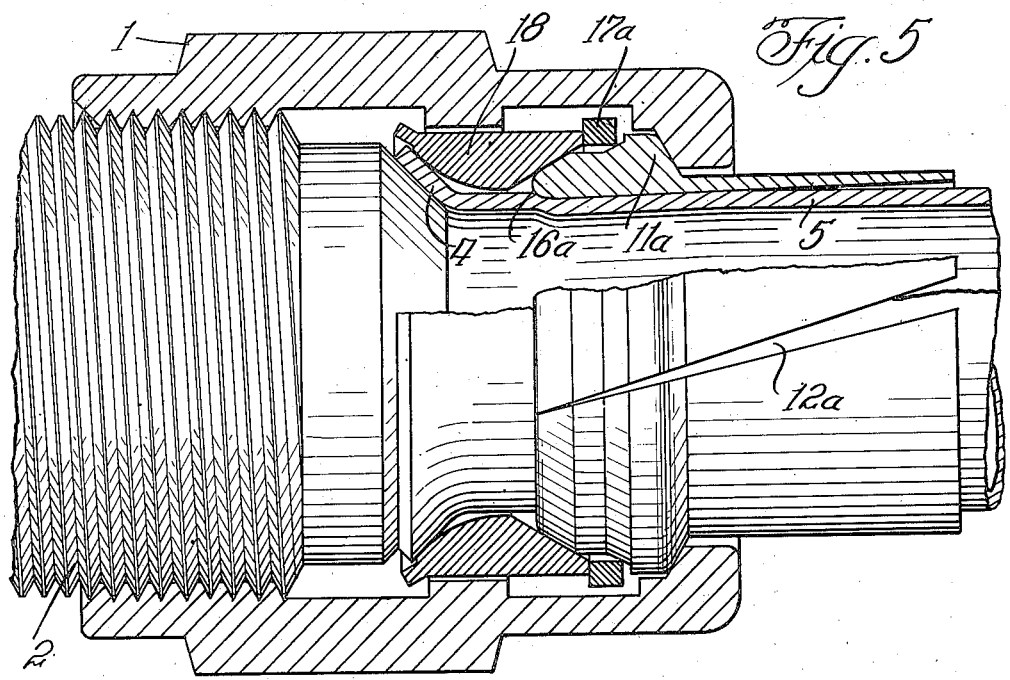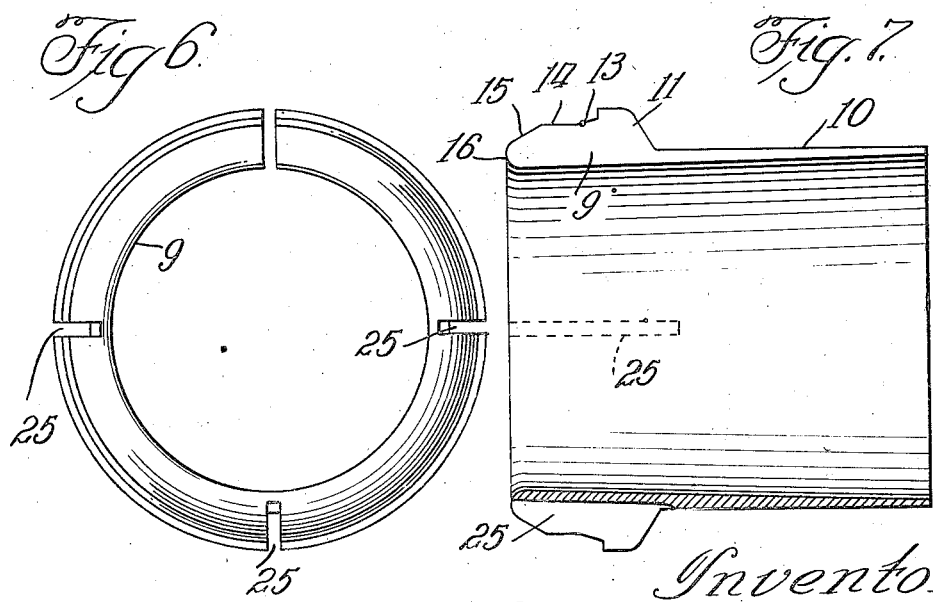

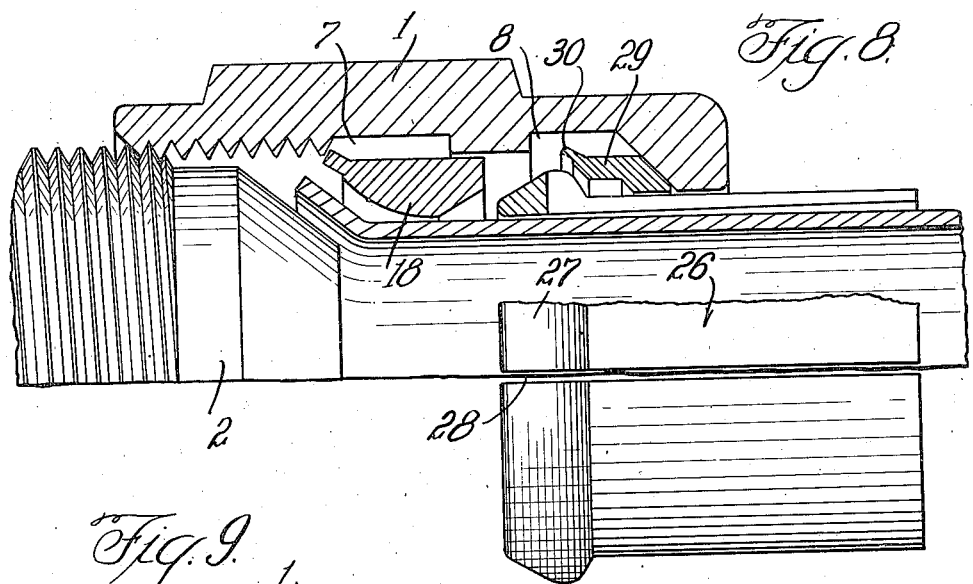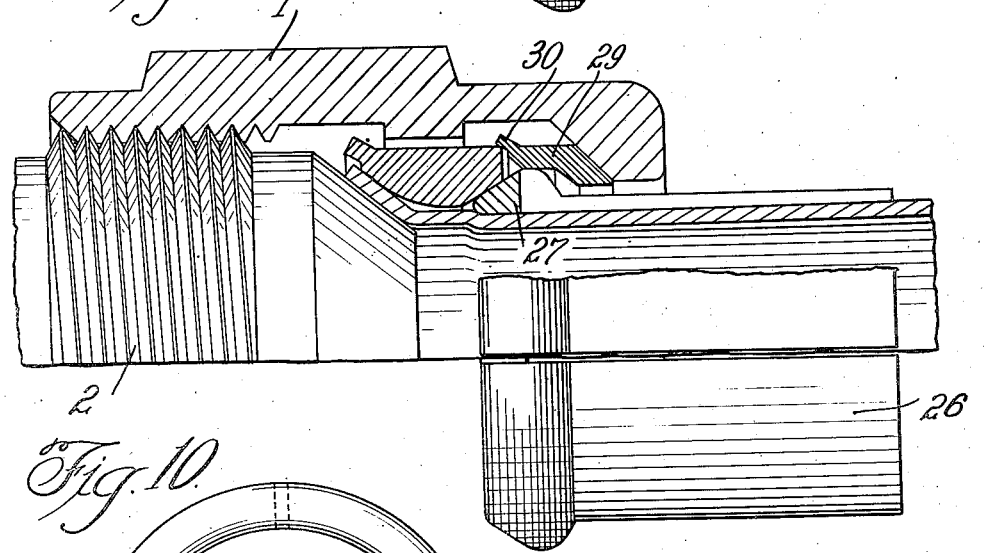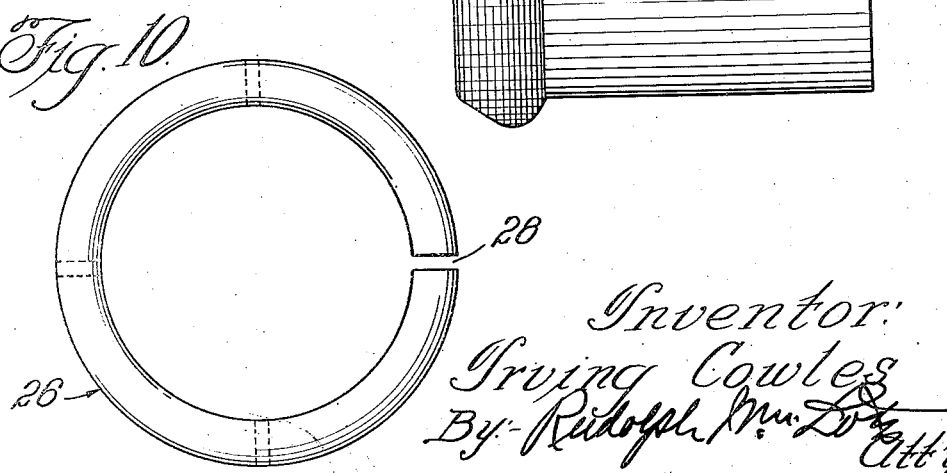

Nov. 20, 1945.  I. COWLES  2,389,233
COUPLING NUT FOR FLANGED TUBING CONDUITS
Filed July 28, 1942   5 Sheets-Sheet 5

Inventor:
Irving Cowles

Patented Nov. 20, 1945

2,389,233

UNITED STATES PATENT OFFICE 2,389,233

COUPLING NUT FOR FLANGED TUBING CONDUITS

Irving Cowles, Detroit, Mich., assignor of seventy per cent to himself and thirty per cent to Rudolph Wm. Lotz, Chicago, Ill.

Application July 28, 1942, Serial No. 452,669

22 Claims. (Cl. 285—122)

This invention relates to improvements in nuts for metal tube conduits and more particularly to conduits of this type wherein the metal tube is equipped with a flared flange adapted to seat upon the tapered seat of a conventional type of fitting with which the nut is adapted to have thread engagement to effect completion of the conduit.

The general and main object of the invention is to provide metallic conduits for use in aircraft, tanks, ships, automotive vehicles of all types and fluid pressure actuated or controlled machinery and equipment generally, which are safe against leakages caused by the loosening of the couplings constituting parts of said conduits under the combined influences of vibration, temperature changes and other stresses, such as tortional stresses on the tube incident to tightening and loosening of the nut, are eliminated, thus to substantially eliminate also the fracturing of the tubes of such conduits due to the above mentioned stresses.

Further important objects of the invention are to provide means within the coupling nut which operate to relieve the portion of the tube which merges into the flange thereof, of tension stresses as well as vibration stresses by effecting contraction of the tube to a predetermined limited degree at a point proximate to its flange and to a progressively less degree to a vanishing point spaced from the point of maximum contraction of said tube, and accomplishing such contraction by the means which effect diffusion and absorption of vibration stresses on the tube to prevent said stresses from reaching the contracted portion of the tube, and wherein the accomplishment of the foregoing results also causes the said means to effect centering of all of the component elements of the conduit relative to the fitting.

A further very important object of the invention is to provide a coupling nut for a conduit which contains a plurality of co-operating parts by means of which the first-mentioned object is attained, wherein said parts are prevented from escaping from the nut, and, preferably, are rendered non-removable therefrom while also being held in their proper relative positions against displacement therefrom.

The last-mentioned feature of improvement is essentially novel and possesses the advantage of presenting a properly pre-assembled structure which can be used again and again without danger of any component part being mislaid, lost, or improperly replaced in co-operative relation to other parts, or result in the sleeve element alone of the nut, minus the other parts, being mounted upon a fitting and thus not producing a fluid tight association of the tube-flange with the fitting.

The many objects and advantages of the invention are set forth or will be understood from the following description and are accomplished in part by the means above referred to and others not mentioned but all of which are fully and particularly described below.

Suitable embodiments of the invention are illustrated in the accompanying drawings wherein:

Fig. 3 is a fragmentary diametric sectional view partly in elevation, showing the completed coupling nut engaged with a fitting and a flanged metal tube to form a completed conduit.

Fig. 4 is a diametric sectional view showing a slightly modified form of construction of a conduit assembly with all parts disposed in substantially relative positions assumed preparatory to tightening the nut to effect completion of the conduit.

Fig. 5 is a view similar to Fig. 4 showing the component parts of the conduit in the relative positions wherein the conduit is completed.

Fig. 6 is a diametric sectional view illustrating a modified form of construction of the split-sleeve of the nut.

Fig. 7 is an end elevation of the split-sleeve shown in Fig. 6.

Figs. 8 and 9 are views similar to Fig. 4 and illustrate a modified form of embodiment of the invention.

Fig. 10 is an end elevation of the split-sleeve of the structure of Figs. 8 and 9.

Figure 1:
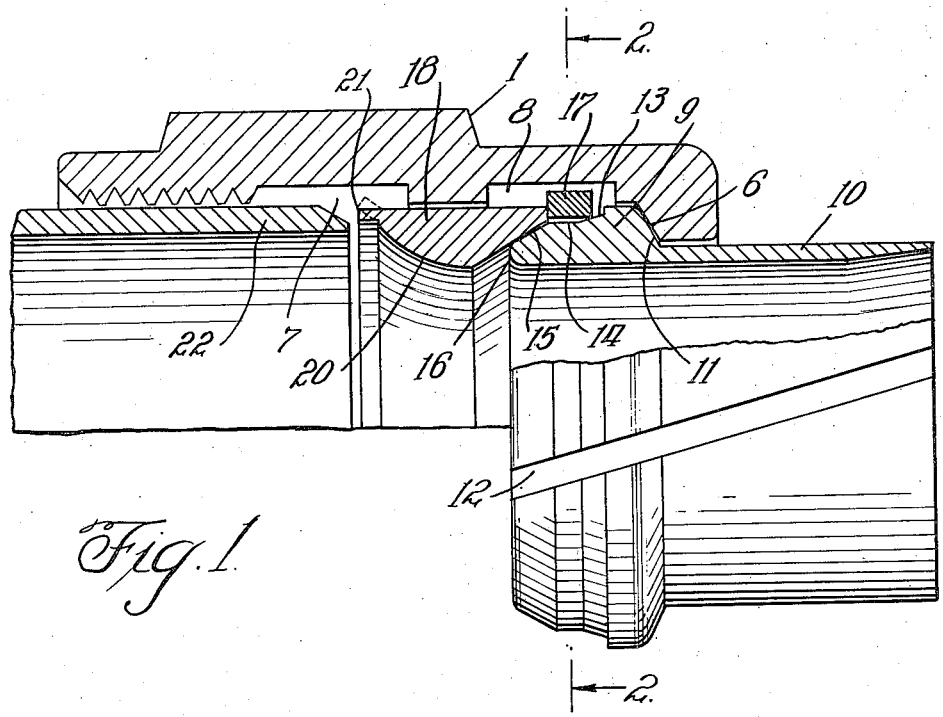
Fig. 1 is a fragmentary radial sectional view of a coupling nut constructed in accordance with the invention, showing the same in its incomplete condition with a tool, also shown fragmentarily, inserted into the same preparatory to completing the structure.

It is well known to those skilled in the art that the flanged tubing, whether composed of hard or soft metal, is most vulnerable along the junction of its flared flange with its body portion and at any point at which vibration causes it to strike an opposed surface such as the outer end or end portion of the nut which holds the flange to its seat. Another point at which fracture of such tubes occurs is at the outer end of a collar clamped about the tube.

These fractures result from crystallization of the metal of the tube under the influence of vibration alone or in conjunction with other stresses. Of the latter a more or less permanent tortional stress on the tube, such as occurs during the final turn of the nut to compress the flange upon its seat, is a strong contributing cause of the loosening of the nut.

The majority of coupling nuts need be turned reversely from tight position only to the extent of one to three degrees to bring them to the position wherein they rotate very easily and freely.

Diffusion and absorption, at least in part, of the vibration stresses on the metal tubes of conduits to lengthen the life of such tubes, has been accomplished in some prior art conduits but none of said conduit structures discloses a combination of elements which also accomplishes the other objects of the invention set forth hereinabove.

The structure of this invention comprises a sleeve-nut 1 which is threaded along one end portion to engage the threads of a fitting 2 which is equipped with a tapered seat 3 for the flange 4 of a tube 5. Reference is had first to Figs. 1 to 5, and Figs. 11 and 12, the latter being duplicates of Figs. 4 and 3, respectively, on an enlarged scale.

The said nut 1 is equipped at its other end with an inwardly projecting annular flange 6 which presents a tapered surface opposed to the threaded end portion of said nut.

The latter is provided between said flange 6 and said threads with spaced apart annular recesses 7 and 8; the former being disposed immediately adjacent the threads, and the latter spaced slightly from the said flange 6.

A split-sleeve, comprising a head portion 9, a shank portion 10 which projects through the flange 6, is also equipped between its ends with the annular flange 11 engaged with said flange 6. Said flange 11 lies between the shank 10 and what is termed the nose portion of the sleeve, the latter being equipped with an angularly disposed longitudinal slot 12 extending from end to end thereof and which, preferably, is of equal width throughout its length.

The nose portion of the head 9 is equipped with a sharply tapered annular surface 13 extending at an angle of thirty or more degrees from the flange 11 to the cylindrical surface 14 which is of about the same length as the surface 13 and terminates at the inner end of the tapered surface 15 which, in turn terminates in an arcuate extremity 16 (in radial section) which is tangential to the surface 15 and the bore of the split-sleeve.

Mounted upon the said nose portion of the split-sleeve is a split-ring 17 of resilient wire and which, preferably, is composed of wire of rectangular cross section. The said split-ring 17 has an inner diameter less than the diameter of the cylindrical surface 14 and, by its self contraction, remains normally disposed upon the said cylindrical surface 14 when the nut 1 is disengaged from or loosely engaged with the fitting 2.

Also mounted within the nut 1 is the flare-ring 18 which is cylindrical externally and is reciprocable in the cylindrical bore portion of the nut 1 lying between the grooves or recesses 7 and 8. Said ring is unsplit and is composed of a metal of high tensile strength to resist the expansion stresses to which it is subjected, as will appear hereinafter.

The smallest diameter bore portion of the ring 18 is very slightly greater than the outer diameter of the tube 5 and lies between the tapered bore portion 19, which receives the nose portion of the split-sleeve in part, and the bore portion 20 which is arcuate in radial section and is opposed to and adapted to bear upon the flange 4 of the tube 5 along an annular line of contact between the ends of said flange.

The arcuate contour of the bore portion or flared mouth 20 of said ring 18 will fit a flange 4 of any degree of taper and its engagement with a flange 4 is of the well-known and advantageous "ball" type common to pipe joints in the pipe fitting art.

Thus the said ring 18 enables a nut 1 equipped therewith, to be made a part of any conduit regardless of the taper of the seat 3 of the fitting 2 thereof and the corresponding taper of the flange 4 of the tube 5 of such conduit, this being of major importance, as hereinafter explained.

The ring 18 is, as shown in Fig. 1, equipped with a cylindrical flange 21 bordering the mouth 20. This flange is flared by means of a suitable tool 22 after said ring 18 is inserted into the nut 1. The outer end of said flange 21, after the same is flared, projects into the recess 7 and thus is rendered non-removable from said nut.

The split-ring 17 has a normal major outer diameter slightly less than the cylindrical bore portion of the nut 1 or about equal to the outer diameter of the ring 18, but when said split-ring 17 is disposed upon the cylindrical surface 14, its outer diameter is greater than the diameter of said last-named bore portion of the nut 1 and is thus trapped within the recess 8 of the nut 1. By cooperation of said ring 17 with the end wall of the recess 8 opposed thereto, said split ring 17 serves also to limit the reciprocable movement of the split-sleeve (on which it remains firmly mounted) with respect to said nut. The similar movement of the flare-ring 18 is limited in one direction by cooperation of the flange 21 thereof with the end wall of the recess 7 opposed thereto, and in the other direction by the split-ring 17 as appears more fully hereinafter.

In assembling the parts of the nut, the latter is disposed preferably with flanged end at bottom in a vise or a suitable fixture mounted upon the bed plate of a suitable press, such support being equipped, necessarily, with an opening to receive the outer end portion of the split-sleeve 9—10.

The split-sleeve 9—10 is then dropped into the nut 1 followed by the split-ring 17, which then rests loosely upon the tapered surface 15 of the nose portion of said split-sleeve. The ring 18 is then dropped into the nut 1 and will have its flat end surface bordering its tapered bore 19 resting upon the split-ring 17.

After the split-sleeve 9—10, the split ring 17 and the flare ring 18 have been inserted into the nut 1, as above described, the beveled end of the tool 22, actuated by the punch press plunger or in any other suitable manner, enters the threaded end of the nut and forces the innermost end portion of the same to first move the split-ring 17 into engagement with the tapered surface 13 of the head portion of the split sleeve 9—10, as shown in Fig. 1, before the ring 18 effects any contraction of the split-sleeve 9—10. Further movement of the ring 18 effects contraction of the split sleeve 9—10 and also moves the split-ring 17 into engagement with the annular shoulder at the end of the tapered surface 13 and thus to the limit of movement of the ring 17.

At this point the ring 18 has also attained the inner limit of its movement and will have effected contraction of the inner end portion of split sleeve 9—10 to a degree less than the slot 12 permits. Obviously, the completion of the stroke of the tool 22 then effects flaring of the flange 21 of the ring 18, the flared flange being shown in Fig. 3.

The withdrawal of the tool 22 permits the split-ring 17 to contract and that contraction causes it to move off of the tapered surface 13 upon the cylindrical surface 14. It thus acts as a spring to force the ring 18 outwardly but that is caused also by expansion of the nose portion of the split-sleeve which is composed of a resilient metal.

The abutment of the split-ring 17 against the flange 11 of the split-sleeve acts to limit the extent to which the nose portion of the latter can be contracted by the ring 18, that degree of contraction being less than the limit fixed by the width of the slot 12.

The width of the recess 7 of the nut 1 is such that the movement of the ring 18 toward the threads 1 is so limited that it will be impossible for the split-ring 17 to leave entirely, the cylindrical surface 14 and thus possibly escape from the recess 8.

In Fig. 1, the tool 22, ring 18 and split-ring 17 are not shown as disposed at their respective limits of movement last referred to in the description of the manner in which the nut 1 and contained parts are permanently assembled. That permanent assembly is of great importance in that the nut assemblies are delivered to the assembly lines of aircraft, tank and other factories in ready to use condition, requiring no nut assembling operations by the assembly line crews or by purchaser other than mounting the nuts upon tubes. The flanged tubes with pairs of said couplings mounted thereupon between the flanges thereof are then mounted into place. This preassembly of the component parts of the nut is of vital importance also in effecting replacements of tubes in factories or fields.

The bore portion 19 of the ring 18 is tapered at an angle such as will not interfere with self-expansion of the head portion of the split-sleeve when the nut 1 is reversed and the pressure of the flare-ring 18 upon the flange 4 is relieved and said ring moves away from said flange.

Figure 11:
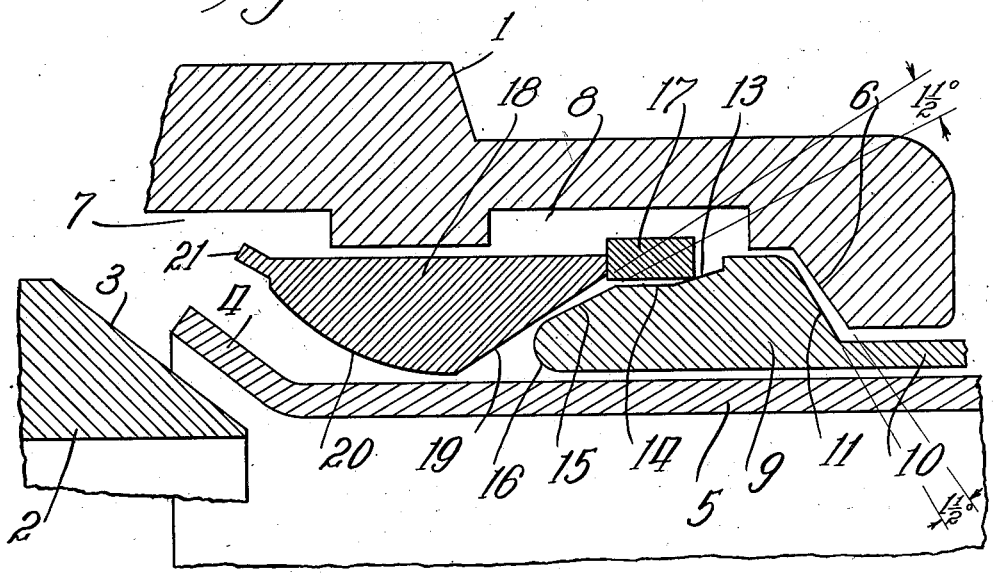
Figs. 11 and 12 are fragmentary detail radial sectional views on a scale larger than the other figures, illustrating an important feature of the invention.
Figure 12:
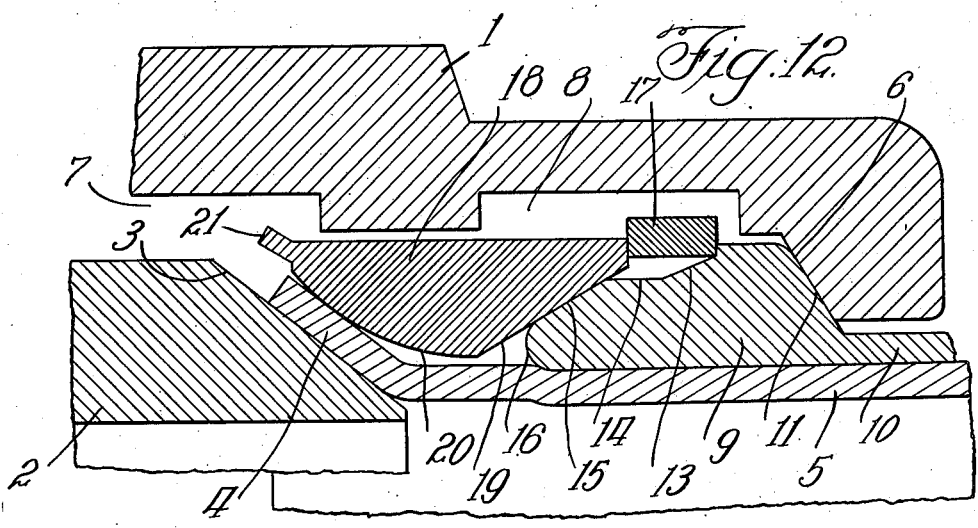

In the instance illustrated, the bore portion 19 of ring 18 is tapered or flared at an angle of thirty degrees to the ring axis while the taper of the surface 15 of the split-sleeve, when the latter is fully expanded, is at an angle of twenty eight and one-half degrees to the axis of the said ring 18 (see Figs. 11 and 12).

Similarly the taper of inner shoulder of the flange 6 is thirty degrees and that of the opposed shoulder of the flange 11 is twenty-eight and one-half degrees to a plane perpendicular to the axis of the nut 1.

These respective tapers are exemplary and may be varied somewhat but have been found very satisfactory in actual practice. They may be increased rather than decreased appreciably as they must be such as to preserve easy self-release of the split sleeve from the flare ring 18 when the nut is disengaged from the fitting.

The bore of the split-sleeve through at least the flange 11 thereof, is cylindrical and may be so throughout the length of same. Said bore is of the same diameter as the smallest diameter bore portion of the ring 18.

As the ring 18 and split-sleeve are forced toward each other beyond their relative positions shown in Fig. 1, the extremity 16 of the split-sleeve will be the first part thereof to be contracted progressively but no such contraction will occur during a coupling operation until the flare-ring is engaged with the flange 4 of the tube 5 and the latter rests upon its seat 3 of the fitting 2. The pressure which effects the progressive contraction of the head portion of the split-sleeve, acts to increase, progressively, its downward pressure on the ring 18 and thus the pressure exerted by the ring 18 upon the flange 4 of the tube.

Obviously the head portion 7 of the split-sleeve resists contraction to a far greater degree than does its thin tail-portion 10 and its inner extremity. Hence, if the angles of tapers of the opposed shoulders 6 and 11a and the opposed surfaces 19 and 15, were alike, the split sleeve would be contracted equally throughout its length. Also the large area contacts of these opposed pairs of tapered surfaces would cause such an increase in resistance to the relative rotation of the nut and the split sleeve, on the one hand, and the relative rotation of the ring 18 and said split sleeve, that at the instant that said ring 18 bears firmly upon the flange 4 of the tube 5, there would be a tendency to impart tortional stress on said flange. But, more particularly, the instant that the split sleeve becomes contracted into gripping relation to the tube 5, there would be a very marked tendency to cause said tube 5 to be rotated and thus to incorporate a permanent tortional stress in the latter which would add to its tendency to crystalize under the aforesaid vibration stresses.

Due to the differences in taper of the opposed shoulders of the nut flange and the split sleeve flange (see Figs. 11 and 12) and until substantially the final tightening turn of the nut is completed, there is only an annular line contact between said shoulders, which reduces to a minimum the resistance to rotation of the nut relative to the split sleeve. This resistance is appreciably less than the resistance to the rotation of the split sleeve relative to the ring 18 and the resistance to rotation of the tube relative to the fitting and the flare ring 18. When the initial annular line contacts aforesaid are presented, the ring 18 is engaged with the tube flange and the latter is engaged with its seat so that both resist rotation relative to each other and the fitting. Hence, since the split sleeve resists contraction to a high degree, every fractional rotation of the nut clockwise causes the ring 18 to exert increased pressure upon the flare ring and thus upon the tube flange to increase their resistance to rotation, the result being that the tube flange and body are completely relieved of tortional stress.

At substantially the instant that the shoulders of the flanges 6 and 11 attain their maximum surface area contact, the split-wire 17 becomes clamped between the flange 11 and the end of the ring 18 so that further rotation of the nut causes its force to be transmitted directly to the ring 18 instead of via the split-sleeve. After the wire 17 is so clamped, the nut 1 can be rotated only a fractional part of a revolution and during the same the said wire 17 acts as a friction reducing element upon which the flange 11 may rotate.

The frictional resistances to rotation of the nut 1 in its clockwise direction are also presented in opposition to its reverse rotation. That resistance is so great that the same degree of force is required to loosen as is applied to the tightening of the nut. In practice the resistance to reverse rotation of the nut extends through an arc of about twenty degrees minimum to ninety degrees or more maximum before the nut is loose enough to be rotated digitally and this long and very appreciable drag prevents the loosening of the nut under the influences of vibration and temperature changes.

The drawings presented herewith are illustrative of a very large size coupling structure which is also made of size to receive a one-quarter inch outer diameter tube, the nut 1 of the small structure being five-eighths inch diameter between flat faces.

From the foregoing description it may appear that the nut structure per se is very complex or far more expensive than the couplings with which it must compete, but that is not so as its cost of manufacture is no more than twenty percent greater than the simplest of competitive structures while its advantages over the latter more than compensate for the greater cost.

Figure 2:
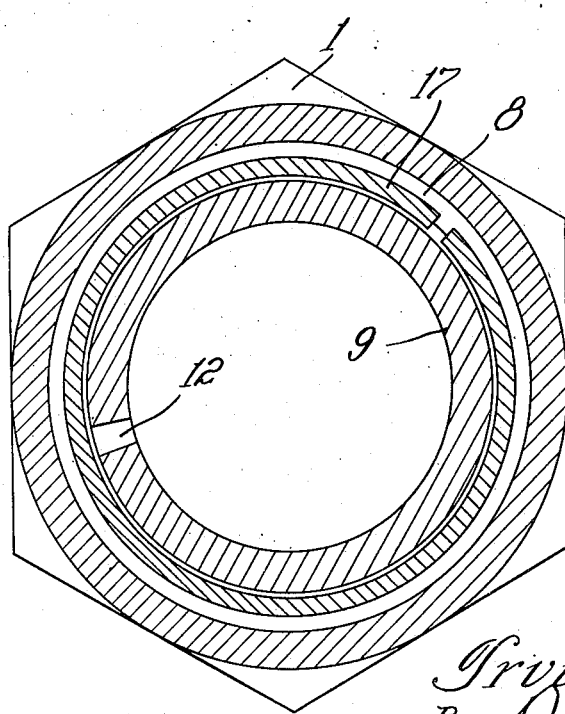
Fig. 2 is a transverse sectional view taken on the line 2—2 of Fig. 1.

While the structure of Figs. 1 to 3 is preferred in that the final force exerted by the nut 1 is transmitted directly to the ring 18 via the wire 17, instead of via the split-sleeve alone, a change from that mode of operation is very easily effected, as shown in Fig. 5.

In the structure of Figs. 1 to 3, the slot 12 must be of sufficient width to prevent its complete closure at the surface 15, the degree of its contraction being limited by the wire 17 which limits the length of movement of the nut 1 relative to the split-sleeve and thus the degree to which the tube 5 is contracted by the latter is also limited definitely.

The same result is attained in the structure of Figs. 4 and 5 by making the slot 12ª narrow enough to limit the degree to which the split-sleeve and the tube 5 can be contracted. The only other change required is to make the split-wire 17ª so narrow that it cannot become clamped between the end of the ring 18 and the flange 11ª of the split-sleeve.

In the structure of Figs. 4 and 5 the closing of the slot 12ª at the surface 16ª renders the split-sleeve just as effective to force the ring 18 upon the flange 4 of the tube as is true of the wire 17 of Fig. 3.

It is obvious that during the tightening of the nut after the flare ring is engaged with the tube flange and the extremity of the nose of the split sleeve is in contact with the surface of the tapered bore portion of said ring and the rim of the shoulder of the flange of the split sleeve is in contact with the tapered shoulder of the flange of the nut, movement of the split-sleeve will be axial relative to the said ring and also radially thereof until the tapered surface of the nose portion meets the surface of the said bore portion.

These coincident movements of the sleeve relative to the nut effect a flexing of the head portion and, of course, of the tail portion of said sleeve so that the tapered shoulder of the latter swings about its perimeter as a fulcrum until said shoulder meets the opposed shoulder of the nut-flange over the total opposed surface areas of said shoulders.

When this degree of flexing of the split sleeve has been reached, all movement of said sleeve relative to the flare-ring and nut stops because said sleeve has then attained the predetermined degree of contraction either by the closing of the slot at the extremity of said nose portion as in the structure of Figs. 4 and 5 or by the limitation incident to the direct transmission of nut pressure to the flare ring via the flange of the sleeve and the split ring 17 as in Figs. 1 to 3, but the further movement of the nut is not limited otherwise than by the high pressure engagement of the flare ring with the tube flange in any of the structures illustrated.

In all of the coupling structures illustrated the head portion of the split-sleeve is of such average radial thickness as to be highly resistant to contraction. The self-expansion of the split sleeve is reduced to the degree to which the metal takes a set while under contraction and said expansion is generally so limited that the tube must be forced from the nut flange first to effect replacement with a new tube. For this reason the angle of taper of the bore portion of the ring 18 which receives the nose portion of the split sleeve must be such as to prevent said ring and sleeve to remain interengaged when the nut is disengaged from the fitting and it is for this reason also that the ring 18 must be capable of being spaced from the split sleeve as otherwise the tube could not be disengaged from the split sleeve. This setting tendency may be reduced by making the split sleeve as shown in Figs. 6 and 7, but this is not desirable.

Said spacing apart of the ring 18 from the head portion of the split sleeve is effected by limiting the movement of the split sleeve 10 of Figs. 1 to 5 inclusive, toward the mouth of the nut via the split ring 17 or 17a in cooperation with the end wall of the annular groove 8 opposed to said ring so that when the latter is engaged with said end wall and the flange 11 or 11a is engaged with the end of said split-ring 17 or 17a, the ring 18 is still free to move toward the mouth of said nut and become disengaged from said split sleeve sufficiently to permit the tube 5 to be forced through said split-sleeve in the event that the latter has taken a set during a period of contraction of same. It is obvious that if no provision were made for spacing the ring 18 from the split-sleeve, as above described, the removal of the tube 5 for replacement by another tube, could not be effected otherwise than by exerting enough force on the tube, longitudinally, to force its flanged end out of the nut and thereby contracting the tube 5 radially throughout an appreciable length of same, and then cutting off said flange and reversing the movement of the tube to withdraw said contracted portion through the flanged end of said nut.

The head portion of the split-sleeve may be modified structurally to render it more self restoring and easier to expand than when constructed as shown in Figs. 1 to 5 inclusive. This modification, illustrated in Fig. 6, consists in cutting longitudinal grooves 25 through the flange 11, surfaces 13 and 14, and through the adjacent end portion of the surface 15, so that the thickness of metal remaining in the nose portion is about equal to that of the shank 10.

This modification as in Figure 6, is not desirable because it defeats the advantages obtained by maximum resistance to contraction of said head portion.

In Figs. 8, 9 and 10 another form of embodiment of the invention is illustrated which is not as efficient as the structures of Figs. 1 to 5 and Figs. 11 and 12 but produces good results.

In Figs. 8, 9 and 10 there is illustrated a split-sleeve 26 having a slightly tapered bore of least diameter at the end of the head portion 27 thereof. The ring 18 may be employed in this structure without change. The taper of the outer surface of the head portion 27 of sleeve 26 is the same as that of the bore portion 19 of the ring 18.

A single slot 28 extends from end to end of the sleeve 26 which is also equipped with two or three additional slots extending from the end of its shank or tail portion partly but not entirely through the head portion, said additional slots 28a being shown in dotted lines in Fig. 10.

The nut 1 is identical with that shown in Figs. 1 to 5 and Figs. 11 and 12. A ring 29, which is provided with a cylindrical outer surface initially, is first inserted into the nut 1. The tool 22, shown in Fig. 1, is then inserted into the nut and operated to flare the flange 30 of the ring 29. The split sleeve 26—27 and the flare ring 18 are then inserted and the tool 22 again operated to flare the flange of the ring 18. A ring 29 having a flared flange 30 engaging in the groove 8 of the nut is first inserted into said nut followed by the split-sleeve 26. The outer diameter of the head portion 27 of the latter is as much less than the inner diameter of the ring 29 as is necessary to limit the degree to which said head portion 27 is desired to contract the tube 5.

The lower edge of the ring 29 is suitably beveled, as on an angle of forty-five degrees and its other edge may be similarly tapered and the opposed shoulder of the flange 6 of the nut tapered correspondingly.

In turning the nut 1 clockwise from the position of Fig. 8 to the position of Fig. 9, the lower tapered surface of the ring 29 bears upon the arcuate edge of the head portion 29 and forces the same into the bore portion 19 of ring 18 and because of resistance of said head 27 to contraction, the latter forces the ring 18 to exert sufficient pressure upon the flange 4 to hold it against rotation on its seat while the head 27 is contracted progressively until it enters the cylindrical bore of the ring or sleeve 29. Further movement of the latter causes it to bear upon the ring 18 to effect further pressure upon the flange 4. The bore of the split sleeve 26 remains tapered, as aforesaid, even though the slot 28 is closed throughout its length when the conduit assembly is complete as shown in Fig. 9.

Since the nut 1 rotates relative to the ring 29 no torsional stress is imparted to the tube 5.

From the foregoing it will be obvious that in all of the illustrated embodiments of the invention vibration stresses on the tube 5 cannot reach the flange 6 nor the portion of said tube embraced by the nose portion of the split-sleeve but will be diffused within the shank or tail portion of the latter to the vanishing point of the free annular space between it and the tube 5.

The soft metal tubes are rarely truly cylindrical and, therefore, the last-mentioned annular space is not likely to be of equal depth at all points.

An advantage of the invention lies in the fact that the parts of the nut are self-centered so that the stresses are distributed as uniformly as is possible in such a structure.

The outer diameters of tubes 5 vary to the extent of several thousandths of an inch such as from two to five thousandths plus or minus a given diameter. This necessitates making the smallest diameter portion of the bore of the split-sleeve slightly larger than the largest tube diameter permitted by the standard range of tolerances applicable thereto. The result is that in most instances there is a very slight annular space between the head portion of the split-sleeve and the tube which is taken up by contraction of the said sleeve.

As to the dimensions of the component parts of the nut assembly, per se, a liberal range of tolerances is permissible and this applies in some degree also to the angles referred to though accuracy with respect to them is advisable in order that the drag on the threads may be maintained at the maximum.

In Figs. 11 and 12 the differences in angles of the bore of the flare-ring and the surface 15 of the split-sleeve, and also the difference in angle of taper of the flange 6 of the nut and the opposed surface of the flange 11 of the split-sleeve, are shown in exaggeration of the angles described hereinabove for the purpose of also showing more clearly the resulting changes in relative positions of the opposed tapered surfaces when the nut is tight.

I claim as my invention:

1. A structure for the purpose specified comprising a sleeve-nut equipped at its outer end with an inwardly projecting flange, a split-sleeve mounted rotatably within said nut for limited longitudinal movement therein between said flange and a predetermined point spaced from the latter, a flare-ring similarly mounted within said nut for limited longitudinal movement from engagement with said split-sleeve to a predetermined point in said nut at which said ring is disengaged from said split-sleeve when the latter is disposed at the limit of its movement away from said nut-flange, said ring and split-sleeve equipped with co-operating formations for effecting contraction of the latter to effect its engagement with the tube, and means interposed between said ring and split-sleeve for yieldingly maintaining the same spaced from each other and for transmitting movement of said split-sleeve to said ring after said sleeve has attained a predetermined degree of contraction.

2. A structure of the type specified comprising a sleeve-nut equipped at its outer end with an inturned flange and equipped with an internal annular groove adjacent said flange, a split-sleeve rotatably mounted within the nut in the path of said flange, a flare-ring rotatably mounted within the nut for engagement by said split-sleeve to force said flare-ring into engagement with the flange of a tube, a spring element engaged within said groove and with said split-sleeve and flare-ring and operating in cooperate with said groove and said flare-ring to limit the longitudinal movement of said split-sleeve relative to the nut and acting also to exert pressure upon the flare-ring to space it from said split-sleeve, said flare-ring being trapped against escape from said nut and against more than limited longitudinal movement therein into and from engagement with said split-sleeve and functioning further to transmit movement of said split-sleeve to said flare-ring as the former is moved by the nut-flange toward said tube flange.

3. A device of the type specified which includes a sleeve-nut equipped with an inturned flange at one end and with an internal annular groove adjacent said flange, a radially contractible resilient split sleeve having a tapered nose portion and an annular flange disposed within said nut with said flange of the latter opposed to said sleeve-flange, a split ring engaged with said split-sleeve in opposed relation to the other face of the latter and projecting into said annular groove for limiting the relative longitudinal movements of said split sleeve and not to a predetermined degree, an unsplit ring having a tube flange engaging surface at one end and a tapered bore-portion in its other end, disposed within the other end portion of said nut with said tapered bore portion adapted to receive said nose portion of said split sleeve for effecting contraction of the nose portion of the latter to a degree limited to be no greater than determined by the width of gap in said nose portion and no less than necessary to cause said nose portion to effect a fixed degree of contraction of the tube, when said ring is engaged with the tube flange and the latter is seated responsive to rotation of the nut in one direction when the same is engaged with the seat fitting.

4. A structure as defined in claim 3 wherein the nut is equipped with a second annular groove spaced from the first mentioned and the said ring is equipped with means engaging in said second named groove for limiting the longitudinal movement of said ring relative to said nut and said split sleeve, the limitation of movement of said ring in the direction of said nut flange with respect to that of said split sleeve being such that said ring can be moved toward the mouth of the nut sufficiently to disengage it from the split-sleeve while remaining trapped against escape from the nut.

5. A structure as defined in claim 3 which includes a split ring interposed between the flange of said split sleeve and the inner end of said ring for limiting the relative longitudinal movements of the latter and the split sleeve in the direction of the mouth of said nut and effecting direct transmission of movement of the nut to said ring after said split-sleeve has been contracted to a pre-determined degree during its primary movement relative to said ring in said last-named direction.

6. A structure as defined in claim 3 wherein the taper of said head portion of said split sleeve is of such degree relative to that of the said bore portion of said nut as to provide an initial free space of progressively increasing width between the opposed tapered surfaces when the extremity of the head portion of said sleeve first contacts the tapered bore surface of said ring and wherein said respective tapered surfaces are in full opposed area pressure engagement with each other when said nut has attained the limit of its movement in the direction of the tube flange.

7. A structure as defined in claim 3 wherein the nut-flange and the split sleeve flange are equipped with opposed tapered surfaces of different degrees and the opposed surfaces of said bore portion of the ring and the nose portion of said split sleeve differ to substantially the same degree to cause initial annular line contacts between said respective pairs of opposed surfaces and full area pressure surface engagement thereof when the nut has attained the limit of its movement in the direction of the tube flange.

8. A structure of the type specified comprising a sleeve-nut equipped at one end with an inturned annular flange presenting a tapered inner shoulder, a radially contractible resilient split sleeve equipped between its ends with an annular flange presenting a shoulder of different taper than said first named shoulder and opposed thereto, an unsplit tube-flange engaging ring associated with said split sleeve within said nut, said split sleeve equipped with an externally tapered contractible nose portion and said ring equipped with a tapered bore portion adapted to receive said nose portion, the tapers of said nose and bore portions differing in taper to substantially the same degree as the aforesaid annular shoulders, said ring being adapted to be forced into pressure exerting relation to the tube flange by said nose portion and to effect contraction of the latter and thereby cause said respective pairs of shoulders to be compressed against each other over their entire opposed areas and thereby cause the tube to be contracted to a progressively decreasing degree from the inner extremity of said sleeve to a point adjacent the flange thereof with the remaining portion of said sleeve progressively farther spaced from the tube to the vanishing point of contraction of the latter to the other end of said sleeve responsive to rotation of the nut when engaged with the fitting upon which the tube flange is seated.

9. A structure as defined in claim 8 wherein the nut and said ring and split sleeve are equipped with cooperating interengaging means whereby the sleeve and ring are trapped against escape from said nut while remaining longitudinally movable relative to each other and said nut, the length of said movement of said ring being greater than that of said sleeve to permit its disengagement therefrom upon reversing the movement of said nut.

10. A structure as defined in claim 8 wherein the nut and said ring and split sleeve are equipped with cooperating interengaging means whereby the sleeve and ring are trapped against escape from said nut while remaining longitudinally movable relative to each other and said nut, and wherein a spring is mounted upon the sleeve in engaging relation to the ring when the latter is engaged with said sleeve for exerting disengaging force upon the latter and said ring.

11. A structure as defined in claim 8 wherein the split sleeve is equipped with a single longitudinal slot extending from end to end thereof which is of such width in said nose portion as to limit contraction of the latter to a predetermined smaller diameter for limiting the extent to which the tube is contracted thereby and wherein the tapered bore portion of the ring acts to contract said sleeve to greatest degree at the extremity of said nose portion, thereby to cause the respective tapered surfaces of said sleeve to meet those of said nut flange and bore portion as said slot attains a predetermined degree of contraction.

12. A structure as defined in claim 2 wherein the spring element acts also to transmit the motion of said nut and split sleeve directly to the flare ring when said split sleeve has attained a predetermined degree of contraction.

13. A structure as defined in claim 2 wherein said spring element is expansible radially and the head portion of the split sleeve is equipped with a spring expanding formation bordering the flange thereof acting to expand the same as said spring engages the inner end of the flare ring to cause said spring to be confined between the latter and said sleeve flange as the nut approximates the attainment of the limit of its movement.

14. A coupling for flanged metal tubing which includes a sleeve nut, a plunger element within the same adapted to be moved thereby toward the flange of a tube extending therethrough and through said element, an unsplit tube flange engaging ring within said nut disposed in the path of said element, said ring equipped with an annular double convex surface adapted to bear upon the flange of the tube, and with a bore portion in its inner end portion shaped for cooperation with means incorporated into said plunger for causing the tube to be firmly engaged against longitudinal movement relative to a fitting upon which the tube flange is seated and held by said ring independently of the pressure of the latter upon said tube flange.

15. A coupling of the type specified including a sleeve nut, a flare-ring within the same, having a tapered bore portion, a normally expanded resilient split sleeve equipped with a tapered end portion engaged in said tapered bore portion of said ring, said nut and sleeve equipped with cooperating means whereby movement of said nut in one direction causes said sleeve to move said ring into engagement with the flange of the tube projecting through said nut and thereafter exert yielding pressure upon said ring while the tapered bore portion of the latter effects contraction of said sleeve portion engaged therein, said sleeve being equipped with stop means acting to limit the movement of said sleeve relative to said ring in said direction and thereafter cause the pressure of said nut on said sleeve to be transmitted unyieldingly to said ring.

16. A coupling of the type specified including a sleeve nut, a flare-ring disposed within the same, a normally expanded resilient split sleeve engaged at one end with said ring, means on the nut engaged with another portion of said sleeve for causing the latter to move said ring primarily into engagement with the flange of tube projecting through said nut and thereafter exerting a yielding pressure upon said ring while said nut continues movement relative to said ring, said ring cooperating with said tube flange and said means on said nut to then effect contraction of said sleeve and thereafter cause further movement of said nut to be transmitted unyieldingly to said ring by said sleeve the latter equipped with a stop means acting to limit the period of yielding transmission of the movement of said nut to said ring and also acting to limit the degree to which said sleeve is contracted.

17. A conduit of the type specified including a tube equipped with an annular projection, a sleeve nut, a ring therein to engage said projection, a normally expanded resilient contractible split sleeve adapted to engage said ring, said nut and sleeve equipped with inter-engaging means to actuate said sleeve responsive to rotation of said nut in one direction to engage said sleeve with said ring and engage the latter with said projection and thereby force the tube into engagement with the seat of the fitting engaged by the threads of said nut, said interengaging means of said nut and sleeve cooperating with the stoppage of said tube to cause said sleeve to exert yielding pressure on said ring following seating of said tube during a predetermined length of further movement of said nut during which said split sleeve is contracted to a predetermined degree, further movement of said nut being then transmitted unyieldingly to said projection.

18. A conduit of the type specified including a tube equipped with an annular projection, a sleeve nut, a ring therein to engage said projection, a normally expanded resilient contractible split sleeve adapted to engage said ring, said nut and sleeve equipped with inter-engaging means to actuate said sleeve responsive to rotation of said nut in one direction to engage said sleeve with said ring and engage the latter with said projection and thereby force the tube into engagement with the seat of the fitting engaged by the threads of said nut, said interengaging means of said nut and sleeve including a tapered surface on one of the nut motion transmitting devices acting under nut pressure to effect contraction of said sleeve in cooperation with the stoppage of travel of said ring to cause said sleeve to exert yielding pressure on said ring until said sleeve has been contracted to a predetermined degree, further movement of said nut being then transmitted unyieldingly to said projection.

19. A conduit including a conventional seat fitting for a flanged tube, a sleeve nut engaged with said fitting and equipped with an inturned flange, a radially contractible split sleeve within and engaged with said nut flange, a tube flange engaging ring between the split sleeve and fitting, said ring and sleeve equipped with cooperating formations whereby, when said nut is rotated in one direction relative to the fitting, said sleeve will force said ring upon the tube flange and will be contracted to grip the tube, and means on the nut and sleeve cooperating to limit the longitudinal movement of the latter within the nut and preventing its escape therefrom and thereby permitting disengagement of the ring from said sleeve.

20. A structure, as defined in claim 19, wherein both the ring and split sleeve are trapped against escape from the nut and the flare ring is capable of greater length of movement than said sleeve within said nut.

21. A flanged tube coupling including a nut equipped at one end with an inturned annular flange presenting a frusto-conical inner shoulder, a split sleeve within the nut equipped with an annular frusto-conical shoulder opposed to the first named shoulder with its perimeter engaged with the latter and its remainder spaced progressively farther therefrom initially, a tube flange engaging unsplit ring in said nut in the path of said split sleeve, the latter and said ring being equipped with opposed annular surfaces normally meeting along an annular line at the inner end of said split sleeve and spaced progressively farther apart toward the larger diameter portions of said surfaces, the last named surfaces and said shoulders, respectively, meeting over their entire opposed surface areas when the ring is tightly compressed upon a tube flange, said opposed shoulders and surfaces cooperating with each other and the tube flange to contract said split sleeve into gripping relation to said tube as the last named relative positions of said shoulders and surfaces are attained.

22. A structure, as defined in claim 21, wherein the opposed shoulders of said split sleeve and nut, and the said annular surfaces of both thereof, are convergent toward their respective largest diameter portions, and wherein the same are also normally convergent from their larger diameter portions toward the initial annular lines of contact with each other.

IRVING COWLES.